United States Patent
Chang

(10) Patent No.: US 7,927,003 B2
(45) Date of Patent: Apr. 19, 2011

(54) LIGHT GUIDE PLATE WITH MICRO-STRUCTURED REFLECTIVE FILM AND LIGHT-EMITTING APPARATUS

(75) Inventor: Yem-Yeu Chang, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 239 days.

(21) Appl. No.: 12/247,216

(22) Filed: Oct. 7, 2008

(65) Prior Publication Data

US 2009/0097273 A1    Apr. 16, 2009

(30) Foreign Application Priority Data

Oct. 12, 2007 (TW) ............................. 96138165 A
Sep. 9, 2008 (TW) ............................. 97134601 A

(51) Int. Cl.
*F21V 7/10* (2006.01)
*F21V 7/22* (2006.01)

(52) U.S. Cl. ............. 362/624; 362/625; 362/26; 349/65

(58) Field of Classification Search .......... 362/623–626, 362/560, 26; 349/65
See application file for complete search history.

(56) References Cited

U.S. PATENT DOCUMENTS

| 5,626,800 | A | | 5/1997 | Williams et al. | |
|---|---|---|---|---|---|
| 5,961,198 | A | | 10/1999 | Hira et al. | |
| 6,074,069 | A | * | 6/2000 | Chao-Ching et al. | ........... 362/26 |
| 6,833,884 | B2 | * | 12/2004 | Kim et al. | ........................ 349/62 |
| 6,846,089 | B2 | * | 1/2005 | Stevenson et al. | ............ 362/627 |
| 7,354,184 | B2 | * | 4/2008 | Parker | ........................... 362/607 |
| 7,478,913 | B2 | * | 1/2009 | Epstein et al. | ................... 362/30 |
| 2004/0125589 | A1 | * | 7/2004 | Sung | ............................... 362/31 |
| 2005/0134963 | A1 | * | 6/2005 | Stevenson et al. | ............ 359/600 |
| 2007/0008739 | A1 | * | 1/2007 | Kim et al. | ..................... 362/612 |
| 2008/0049330 | A1 | * | 2/2008 | Tolbert et al. | ................. 359/599 |

FOREIGN PATENT DOCUMENTS

CN    1746741    3/2006

OTHER PUBLICATIONS

"1st Office Action of China counterpart application", issued on Oct. 23, 2009, p. 1-p. 9.

* cited by examiner

*Primary Examiner* — Ismael Negron
(74) *Attorney, Agent, or Firm* — Jianq Chyun IP Office

(57) ABSTRACT

A light guide plate including a transparent light guide substrate and a micro-structural reflective film is provided. The transparent light guide substrate has a light-emitting surface, a bottom surface opposite to the light-emitting surface, and at least one light incident surface connecting the light-emitting surface and the bottom surface. The micro-structural reflective film is disposed below the bottom surface of the transparent light guide substrate and includes a micro-structural layer and a reflective material layer. The micro-structural layer has a plurality of micro-structures, and the reflective material layer covers the micro-structures of the micro-structural layer. Only top ends of the micro-structures and the reflective material layer are laminated on the transparent light guide substrate, such that there is an air gap between the transparent light guide substrate and the micro-structural reflective film. Furthermore, a light-emitting apparatus having the light guide plate is also provided.

40 Claims, 12 Drawing Sheets

LIGHT GUIDE PLATE WITH MICRO-STRUCTURED REFLECTIVE FILM AND LIGHT-EMITTING APPARATUS

CROSS-REFERENCE TO RELATED APPLICATION

This application claims the priority benefits of Taiwan patent applications serial no. 96138165, filed on Oct. 12, 2007, and serial no. 97134601, filed on Sep. 9, 2008. The entirety of each of the above-mentioned patent applications is hereby incorporated by reference herein and made a part of specification.

BACKGROUND OF THE INVENTION

1. Field of the Invention

The present invention relates to a light guide plate and a light-emitting apparatus. More particularly, the present invention relates to a laminated light guide plate, which uses a reflective material and micro-structures to limit the light-emitting angles in a small range, and generates an air gap by means of partial lamination, so as to reduce the light absorption of the reflective material, such that the light-emitting apparatus using the light guide plate has a high light-emitting efficiency.

2. Description of Related Art

With the maturity of photoelectric technology and semiconductor manufacturing technology, flat panel displays are developed rapidly. Among them, liquid crystal displays (LCD), having advantages of low operating voltage, no radiation, light weight, and small volume, gradually replace the conventional cathode ray tube displays and become mainstream display products in recent years.

Generally speaking, LCD panels are non-self-light-emitting display panels and need a backlight module to provide a backlight source. Usually, an edge-lit type backlight module includes a light guide plate and at least one light source. The light guide plate functions to convert a point or linear light source into a planar light source. FIG. 1 is a schematic view of a conventional edge-lit type backlight module. Referring to FIG. 1, a conventional edge-lit type backlight module 100 includes a light source 110, a light guide plate 120, and a reflector 130, as well as four optical films including two diffusers 140 and two prism sheets 150. The prism sheets 150 are also referred to as brightness enhancement films (BEF) for deflecting light rays to a normal viewing direction, thus having the effects of gathering light and enhancing brightness. The diffusers 140 have the function of light diffusion and making the brightness distribution of light become uniform. Therefore, in order to improve the using efficiency of the light source and achieve the effect of power saving, the conventional backlight module 100 mostly adopts a plurality of optical films. The cost of the films takes up to 30%-40% of the total cost of the backlight module 100, thus leading to a high cost of the backlight module 100. Furthermore, the films also occupy a certain space, so that the thickness and volume of the backlight module 100 are difficult to be reduced.

Furthermore, a reflector 130 is generally disposed below the light guide plate 120. Patents U.S. Pat. No. 5,961,198 and TW 486,101 disclose a technique of plating a reflective layer on a light guide plate without disposing a reflector in the backlight module. When the light is delivered in the light guide plate, the light is frequently reflected by the interface and keeps conducting in the light guide plate. If the reflection is totally reflection with the difference of reflection index, the interface absorption may be regarded as zero. However, the reflectivity of a common metal is 90-98%, and the interface absorption after multiple times of reflections cannot be neglected, and may even be 30% or above. For example, when a reflective layer having a reflectivity of 95% is used together with a light guide plate of 0.3 mm to 1.0 mm thick, under a deliver length of 80 mm, the light absorption of the metal is approximately 20% to 50%. Therefore, the practicality of this technique is reduced because of the problem of high absorption of the reflective material. If the light absorption can be greatly reduced when only depositing a reflective material on the micro-structures, the practicality of the technique may be improved.

SUMMARY OF THE INVENTION

Accordingly, the present invention is directed to a laminated light guide plate having an air gap, which can reduce the light absorption of a reflective material, thus improving the using efficiency of the light source.

The present invention further provides a light-emitting apparatus using the light guide plate, which has a high light-emitting efficiency, thus reducing the number of the optical films and further reducing the production cost.

In order to illustrate the content of the present invention in detail, a laminated light guide plate having an air gap is provided, which includes a transparent light guide substrate and a micro-structural reflective film. The transparent light guide substrate has a light-emitting surface, a bottom surface opposite to the light-emitting surface, and at least one light incident surface connecting the light-emitting surface and the bottom surface. Further, the micro-structural reflective film is disposed below the bottom surface of the transparent light guide substrate and includes a micro-structural layer and a reflective material layer. The micro-structural layer has a plurality of micro-structures, and the reflective material layer covers the micro-structures of the micro-structural layer. Only the top ends of the micro-structures and the reflective material layer are partially laminated on the transparent light guide substrate, such that an air gap is existed between the transparent light guide substrate and the micro-structural reflective film.

The present invention further provides a light-emitting apparatus, which includes at least one light source and a light guide plate. The light guide plate includes a transparent light guide substrate and a micro-structural reflective film. The transparent light guide substrate has a light-emitting surface, a bottom surface opposite to the light-emitting surface, and at least one light incident surface connecting the light-emitting surface and the bottom surface. The light source is disposed on the end of the light incident surface. The micro-structural reflective film is disposed below the bottom surface of the transparent light guide substrate and includes a micro-structural layer and a reflective material layer. The micro-structural layer has a plurality of micro-structures, and the reflective material layer covers the micro-structures of the micro-structural layer. Only the top ends of the micro-structures and the reflective material layer are partially laminated on the transparent light guide substrate, such that an air gap is existed between the transparent light guide substrate and the micro-structural reflective film.

The light guide plate of the present invention uses a transparent light guide substrate and a micro-structural reflective film, such that the light emitting direction can be well controlled by the reflective micro-structures. The light-emitting apparatus having the light guide plate also has high light-emitting efficiency.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
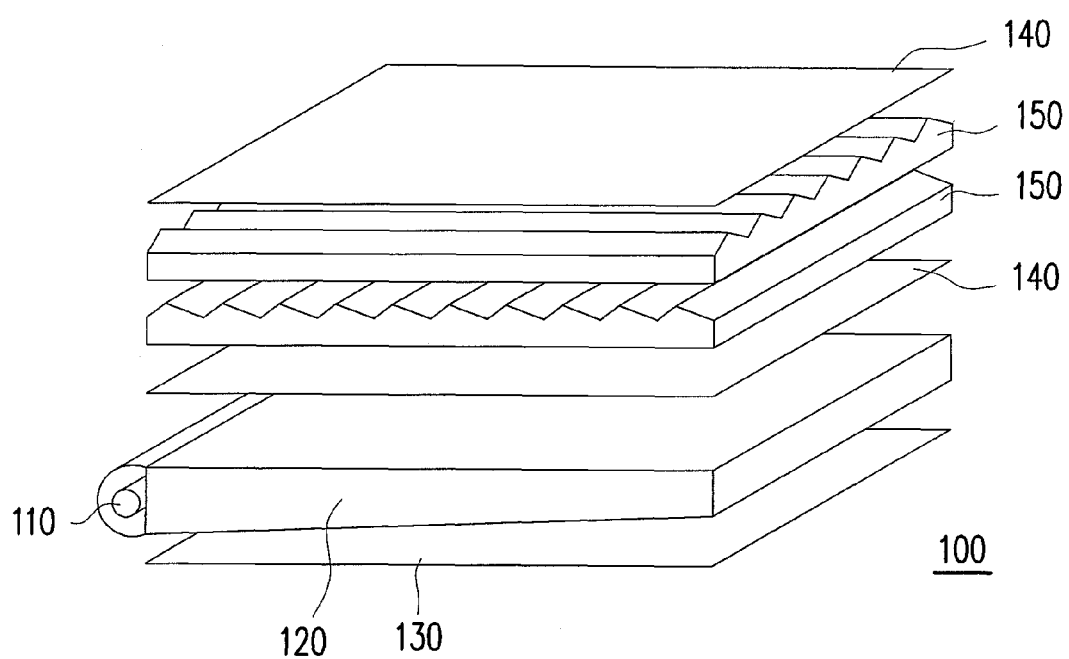
FIG. 1 is a schematic view of a conventional edge-lit type backlight module.
Figure 2A:
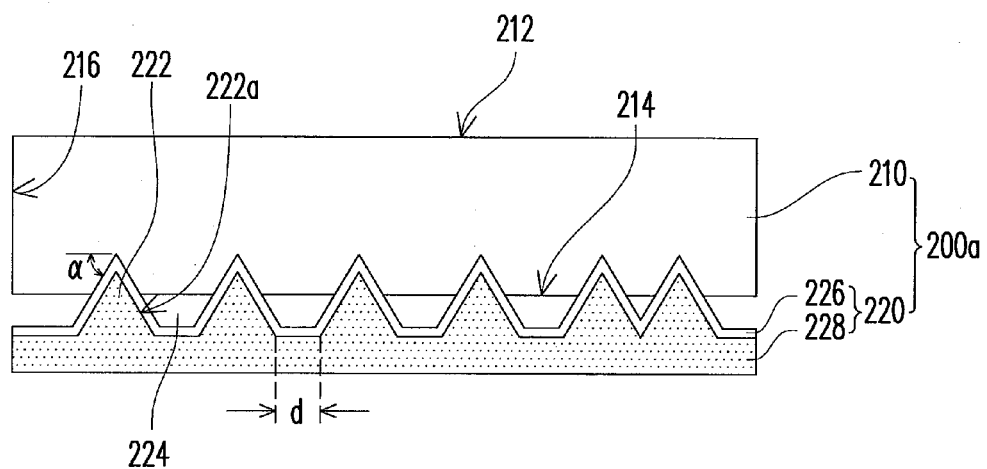
FIGS. 2A and 2B are schematic views of a light guide plate according to an embodiment of the present invention.

FIG. 2A is a schematic view of a light guide plate according to an embodiment of the present invention. Referring to FIG. 2A, a light guide plate 200a includes a transparent light guide substrate 210 and a micro-structural reflective film 220. The transparent light guide substrate 210 has a light-emitting surface 212, a bottom surface 214 opposite to the light-emitting surface 212, and at least one light incident surface 216 connecting the light-emitting surface 212 and the bottom surface 214. The material of the transparent light guide substrate 210 may be, but not limited to, polymethyl methacrylate (PMMA), polycarbonate (PC), or cyclic olefin copolymers.

Furthermore, the micro-structural reflective film 220 is disposed below the bottom surface 214 of the transparent light guide substrate 210. The micro-structural reflective film 220 includes a micro-structural layer 228 and a reflective material layer 226. The micro-structural layer 228 has a plurality of micro-structures 222, and the reflective material layer 226 covers the micro-structures 222 of the micro-structural layer 228. Only the top ends of the micro-structures 222 and the reflective material layer 226 are partially laminated on the transparent light guide substrate 210, such that an air gap 224 is existed between the transparent light guide substrate 210 and the micro-structural reflective film 220. The material of the reflective material layer 226 may be, but not limited to, silver, aluminum, titanium, nickel, chromium, or an alloy thereof. The height of the micro-structures 222 is between 3 µm and 50 µm. In this manner, when the light enters the transparent light guide substrate 210 from the light incident surface 216, since the air gap 224 is formed between the transparent light guide substrate 210 and the micro-structural reflective film 220, and the refractive index of the transparent light guide substrate 210 is greater than or equal to that of the air in the air gap 224, most of the light is totally reflected at the interface of the transparent light guide substrate 210 and the air gap 224. Therefore, the light can keep on conducting in the transparent light guide substrate 210. Only a small part of the light contacts the interface of the transparent light guide substrate 210 and the micro-structural reflective film 220, and is reflected and deflected by the reflective material layer 226 to out-couple from the light-emitting surface 212. Particularly, although the reflective material layer 226 has certain absorption for the light, since the contact area of the micro-structural reflective film 220 and the transparent light guide substrate 210 is small, only a small part of the light will contact the reflective material layer 226. Most of the light will still be totally reflected at the interface of the transparent light guide substrate 210 and the air gap 224, thus reducing the light absorption and further increasing the proportion of the light emitting from the light-emitting surface 212.

The micro-structural reflective film 220 may be fabricated by molding. For example, first, a mold having a micro-structural pattern and coated with a liquid UV curable resin is provided. Next, a film is pressed on the liquid UV curable resin. Then, the film is irradiated by a UV lamp to cure the resin. The resin is molded in accordance with the micro-structures on the mold, and has the micro-structural pattern after being cured. Thereafter, a mold release process is performed to obtain the film having the micro-structures, i.e., the micro-structural layer 228. And then, a reflective material layer 226 is formed on the surface of the micro-structural layer 228, and thus the fabrication of the micro-structural reflective film 220 is completed.

After the fabrication of the micro-structural reflective film 220 is completed, the top ends of the micro-structures 222 and the reflective material layer 226 are partially pressed into the transparent light guide substrate 210, and thus the micro-structural reflective film 220 is combined with the transparent light guide substrate 210. For example, under the condition of a specific temperature, the transparent light guide substrate 210 is partially or locally softened slightly, and then the top ends of the micro-structures 222 of the micro-structural reflective film 220 and the reflective material layer 226 are partially pressed into the transparent light guide substrate 210.

Figure 2B:
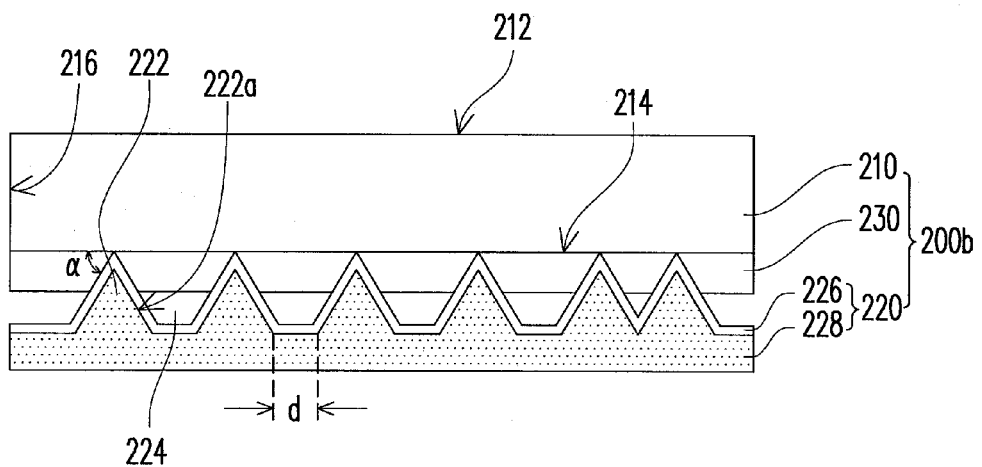

In another embodiment of the present invention, as shown in FIG. 2B, the light guide plate 200b may further include an adhesion layer 230 disposed between the bottom surface 214 of the transparent light guide substrate 210 and the micro-structural reflective film 220, and some air gap 224 is located between the micro-structural reflective film 220 and the adhesion layer 230. More particularly, the space of the air gap 224 is formed by the reflective material layer 226 and the adhesion layer 230. The refractive index of the adhesion layer 230 is greater than or equal to that of the transparent light guide substrate 210. It should be noted that the thickness of the adhesion layer 230 is between 0.1 µm and 20 µm, and the height of the micro-structures 222 is between 3 µm and 50 µm, and the height of the micro-structures 222 must be greater than that of the adhesion layer 230. In this manner, the air gap 224 is formed between the adhesion layer 230 and the micro-structural reflective film 220. When the light enters the transparent light guide substrate 210 from the light incident surface 216, since the refractive index of the adhesion layer 230 is greater than or equal to that of the transparent light guide substrate 210, the light is refracted to enter the adhesion layer 230. Furthermore, since the refractive index of the adhesion layer 230 is greater than or equal to that of the air gap 224, the light is totally reflected at the interface of the air gap 224 and the adhesion layer 230 to return to the adhesion layer 230 and can keep on conducting in the transparent light guide substrate 210. Only a small part of the light contacts the interface of the adhesion layer 230 and the reflective material layer 226, and is reflected and deflected by the reflective material layer 226 covering the micro-structures 222, and then emits from the light-emitting surface 212. Additionally, the adhesion layer 230 may be made of a transparent polymer material, such as, a thermal melt adhesive, a thermal curable adhesive, or a UV curable resin.

In an embodiment, the method of laminating the micro-structural reflective film 220 on the light guide substrate 210 includes the following steps. First, a liquid adhesion layer 230 is coated on the bottom surface 214 of the transparent light guide substrate 210 by a precision thickness-controlling coater. Next, the micro-structural reflective film 220 is pressed on the adhesion layer 230. Then, a pressurizing and curing process is performed to make the top ends of the micro-structures 222 of the micro-structural reflective film 220 and the reflective material layer 226 be embedded into the adhesion layer 230, and the embedding depth just makes the top ends of the micro-structures 222 and the reflective material layer 226 contact the light guide substrate 210, and meanwhile to cure the adhesion layer 230. The curing process may be performed by irradiating of UV light or heating.

Referring to FIGS. 2A and 2B, it should be noted that in an embodiment, a distance d is formed between the adjacent micro-structures 222, and the distance d descends in the direction away from the light incident surface 216. In another embodiment, the size of the micro-structures 222 may be increased in the direction away from the light incident surface 216. Through the two designs of the micro-structures 222, the light entering from the light incident surface 216 may uniformly out-couple from the light-emitting surface 212. Furthermore, each micro-structure 222 has at least one side surface 222a. The included angle a formed between the side surface 222a and the bottom surface 214 of the transparent light guide substrate 210 is between 25 degrees and 40 degrees. The side surface 222a may be a flat surface or a curved surface. Definitely, those of ordinary skills in the art can make appropriate modifications to the included angle a formed between the side surface 222a and the bottom surface 214 of the transparent light guide substrate 210 according to the actual requirements. In this manner, when the light enters from the light incident surface 216, the light output intensity in a partial area may be adjusted by adjusting the distance d between the micro-structures 222 and the size of the micro-structures 222, so as to control the uniformity of the light emitting from the light-emitting surface 212.

Figure 2C:
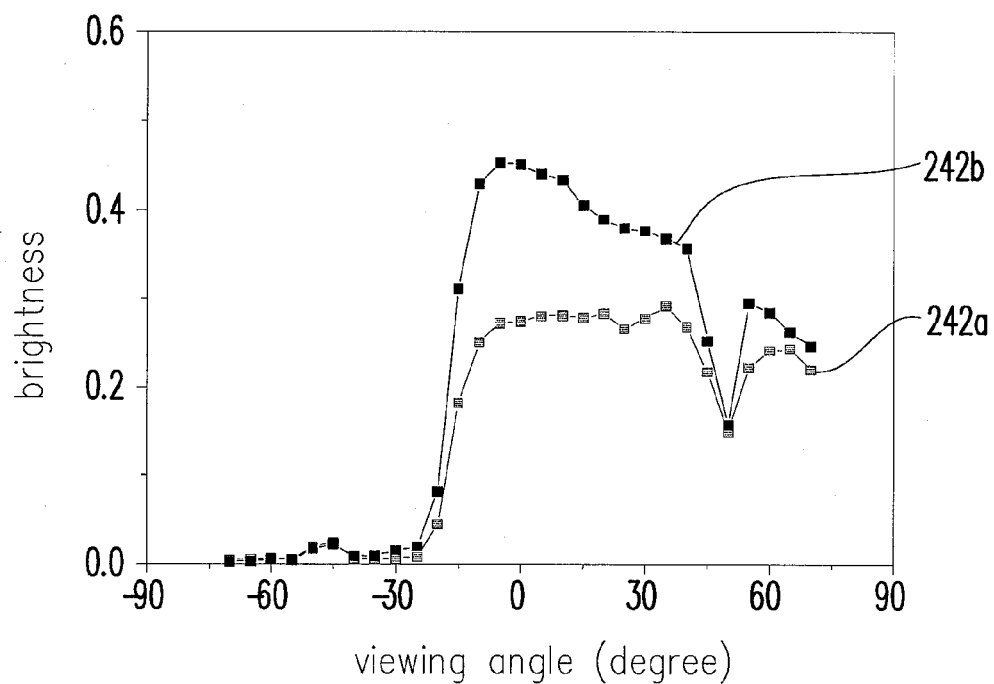
FIG. 2C is a brightness angular distribution diagram when the light is incident on a conventional light guide plate and the light guide plate in FIG. 2A.

FIG. 2C is a brightness angular distribution diagram when the light is incident on a conventional light guide plate with a bottom surface completely coated with a reflective material layer (that is, the bottom surface of the light guide plate is coated with a reflective material layer) and the light guide plate in FIG. 2A, in which the transverse axis indicates the viewing angle, and the longitudinal axis indicates the relative brightness. Referring to FIGS. 2A and 2C together, a curve 242a shows a relationship between the viewing angle and the brightness when the light is incident on the conventional light guide plate through the light incident surface and emitted from the light-emitting surface, in which the bottom surface of the light guide plate is completely coated by a reflective material layer directly. A curve 242b shows a relationship between the viewing angle and the brightness when the light is incident on the light guide plate 200a in FIG. 2A through the light incident surface 216 and emitted from the light-emitting surface 212. It can be known by comparing the curve 242a with the curve 242b, as the light guide plate 200a in FIG. 2A has the microstructures 222 and the air gap 224, a part of the reflective material layer 226 contacts the transparent light guide substrate 210, so that the light guide plate 200a has better luminance performance at a viewing angle between −20 degrees and +45 degrees, as compared with the conventional light guide plate. In other words, the film design adopting the light guide plate 200a of the present invention provides better luminance performance than the conventional light guide plate.

Figure 2D:
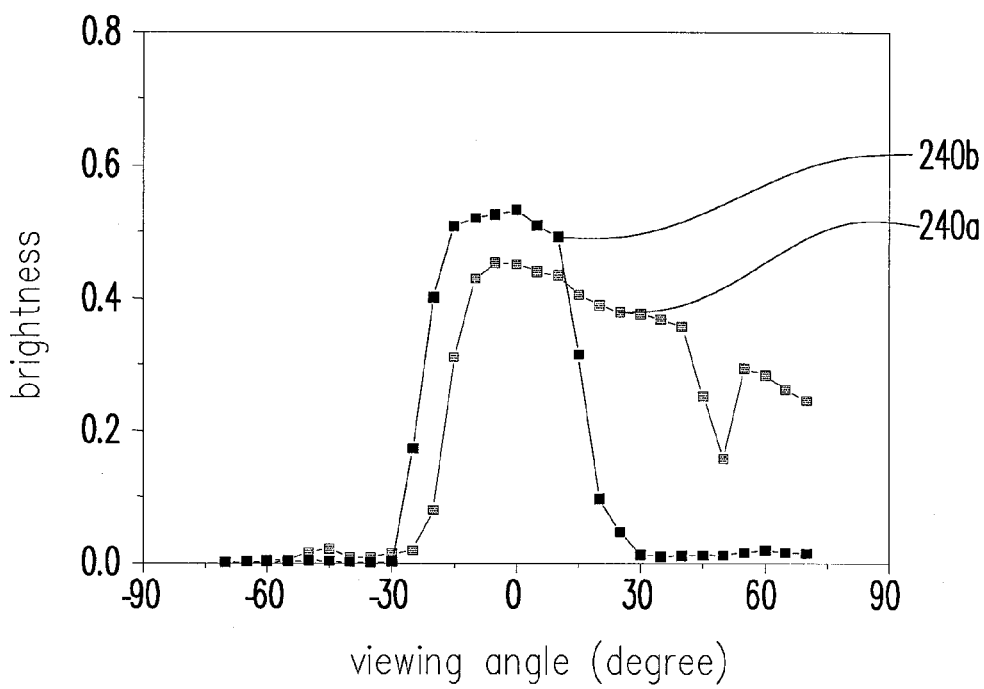
FIG. 2D is a brightness angular distribution diagram when the light is incident on the light guide plate in FIGS. 2A and 2B.

Further, FIG. 2D is a brightness angular distribution diagram when the light is incident on the light guide plate in FIGS. 2A and 2B, in which the transverse axis indicates the viewing angle, and the longitudinal axis indicates the relative brightness. Referring to FIGS. 2A and 2D together, a curve 240a shows a relationship between the viewing angle and the brightness when the light is incident on the light guide plate 200a through the light incident surface 216 and emitted from the light-emitting surface 212. As known from the curve 240a that, after the light is emitted from the light guide plate 200a, the brightness angular distribution shows a better luminance performance at a viewing angle between −20 degrees and +45 degrees.

In addition, referring to FIGS. 2B and 2D together, a curve 240b shows a relationship between the viewing angle and the brightness when the light is incident on the light guide plate 200b through the light incident surface 216 and emitted from the light-emitting surface 212. In this embodiment, the refractive index of the adhesion layer 230 is 0.11 higher than that of the light guide substrate 210. The brightness angular distribution after the light is emitted from the light guide plate 200b can be known from the curve 240b. The brightness angular distribution shows the better luminance at a viewing angle between −30 degrees and +30 degrees, and the concentrated luminescent property enables the energy to be effectively utilized and improves the on-axis brightness by 18%, which thus is applicable to a personal display device.

Figure 2E:
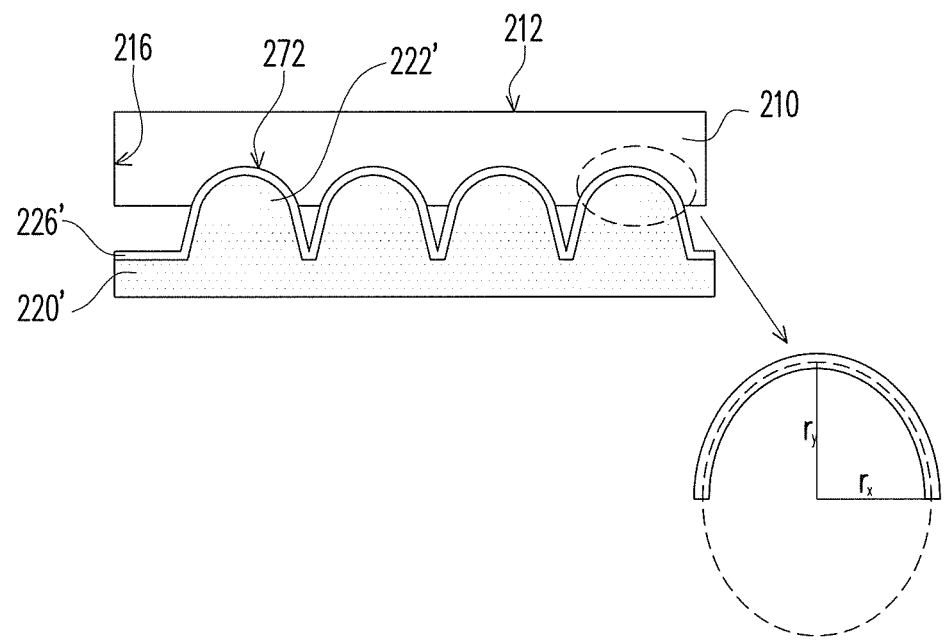
FIG. 2E is a schematic view of a light guide plate according to another embodiment of the present invention.
Figure 2F:
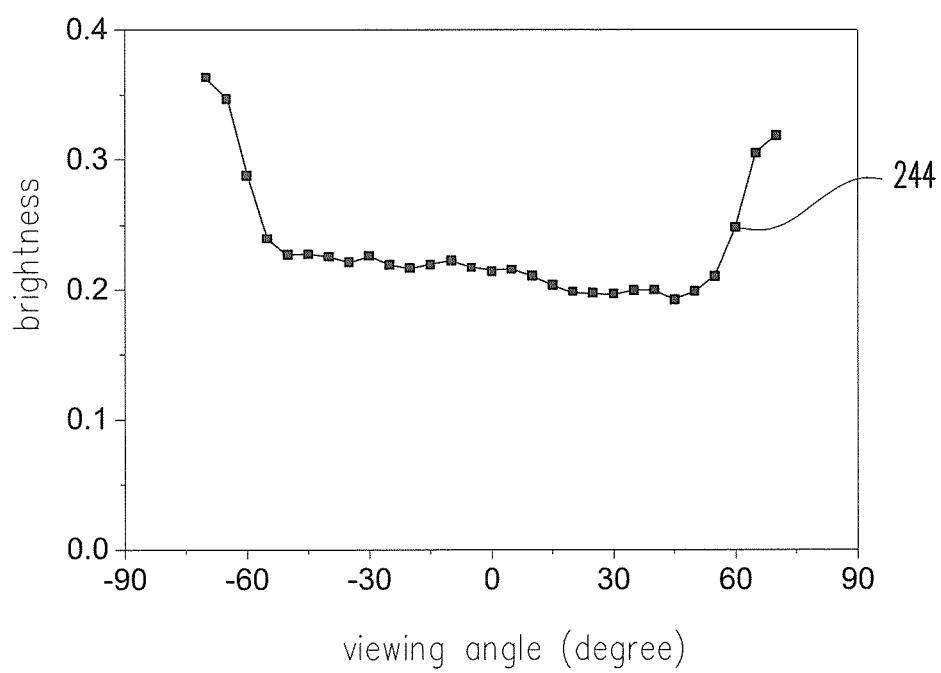
FIG. 2F is a brightness angular distribution diagram when the light is incident on the light guide plate in FIG. 2E.

Further, in an embodiment, the microstructures 222 may be elliptical arc-column-shaped, as shown in FIG. 2E. Each top end 272 of the microstructure 222' in FIG. 2E may be an arc column with a curvature radius or an elliptical arc column with a major axis $r_x$ and a minor axis $r_y$. In this embodiment, an elliptical arc column is taken as an example, in which the major axis $r_x$ is 20 μm, the minor axis $r_y$ is 18 μm, and a height of the micro-structures 222' embedded into the light guide substrate 210 is 15 μm, as shown in FIG. 2E. In addition, FIG. 2F is a brightness angular distribution diagram when the light is incident on the light guide plate in FIG. 2E, in which the transverse axis indicates the viewing angle, and the longitudinal axis indicates the relative brightness. Referring to FIGS. 2E and 2F together, a curve 244 shows a relationship between the viewing angle and the brightness when the light is incident on the light guide plate in FIG. 2E through the light incident surface 216 and emitted from the light-emitting surface 212. As known from the curve 244 that, after the light is emitted from the light-emitting surface 212, the brightness angular distribution thereof has a certain brightness at full viewing angles, thus being applicable to the wide-angle display, as shown in FIG. 2F.

In view of the above, if the user wants to have the high on-axis brightness but has no special requirements on the viewing angle range, the film structure of the light guide plate 200b in FIG. 2B is preferably adopted. On the contrary, if the user requires a wide viewing angle range but has no special requirements on the brightness, the film structure of the light guide plate in FIG. 2E can be adopted. That is to say, it is determined whether to adopt the structure of the light guide plate in FIG. 2B or 2E or not depending upon the demands of the user, and the above description is merely intended for demonstration.

Figure 2G:
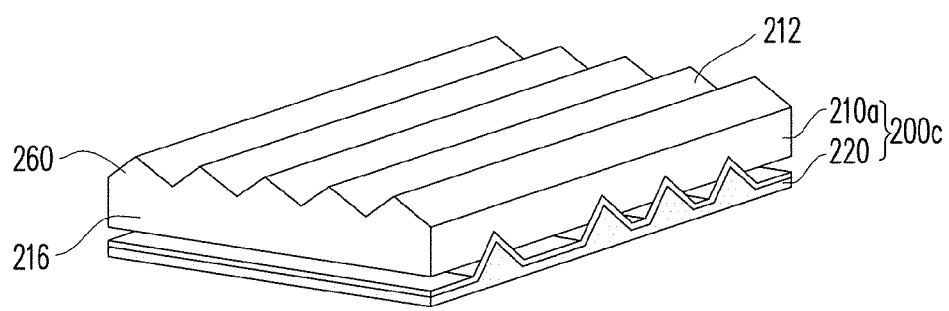
FIGS. 2G and 2H are schematic views of light guide plates with different implementation aspects.
Figure 2H:
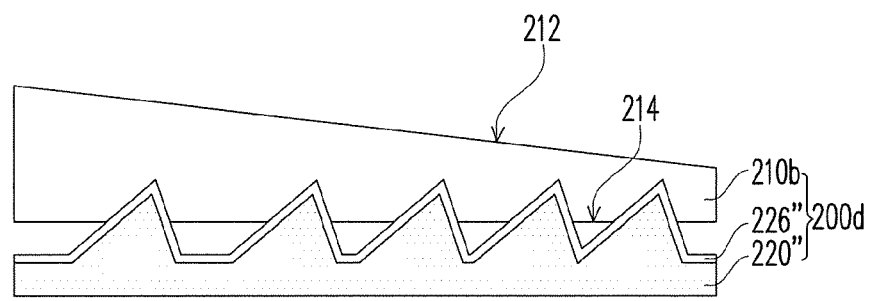

Further, FIGS. 2G and 2H are schematic views of light guide plates with different implementation aspects. Referring to FIG. 2G, the light guide plate 200c has a structure similar to that of the light guide plate 200a in FIG. 2A, and the difference there-between lies in that, the light-emitting surface 212 of the transparent light guide substrate 210a in FIG. 2G has a plurality of light emitting microstructures 260 disposed thereon. The light emitting microstructures 260 are arranged in a direction vertical to the direction for arranging the microstructures 222, as shown in FIG. 2G. The above description is merely taken as an example, and those of ordinary skill in the art can make the arrangement direction of the light emitting microstructures 260 form a suitable angle with respect to the arrangement direction of the microstructures 222 of the microstructure reflective film 220. It should be noted that, the original transparent light guide substrate 210 of the light guide plate 200b in FIG. 2B may also be replaced by the transparent light guide substrate 210a, so as to form a light guide plate with another implementation aspect. In other words, in the structure in FIG. 2B, a plurality of light emitting microstructures (not shown) may be disposed on the light-emitting surface 212 of the transparent light guide substrate 210, so as to improve the optical performance of the light guide plate.

Further, referring to FIG. 2H, the light guide plate 200d has a structure similar to that of the light guide plate 200a in FIG. 2A, and the difference there-between lies in that, the transparent light guide substrate 210 in FIG. 2A has a parallel plate structure, whereas the transparent light guide substrate 210b in FIG. 2H has a wedge-shaped structure. Particularly, the light-emitting surface 212 forms a certain angle (not shown) with respect to the bottom surface 214 of the transparent light guide substrate 210b. That is to say, the light-emitting surface 212 and the bottom surface 214 are not parallel to each other, but, for example, form a wedge-shaped structure in FIG. 2H. Similarly, the original transparent light guide substrate 210 of the light guide plate 200b in FIG. 2B may also be replaced by the transparent light guide substrate 210b with a wedge-shaped structure.

Figure 3A:
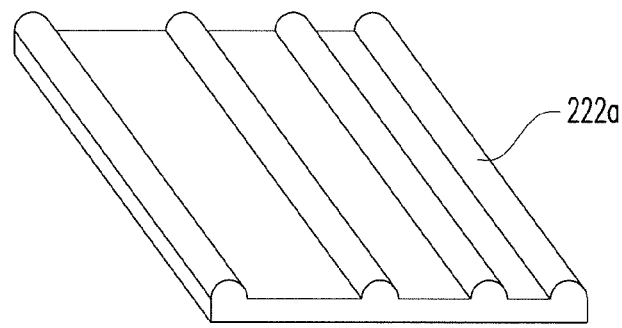
FIGS. 3A to 3O are schematic views of micro-structural layers of micro-structural reflective films in different aspects.
Figure 3B:
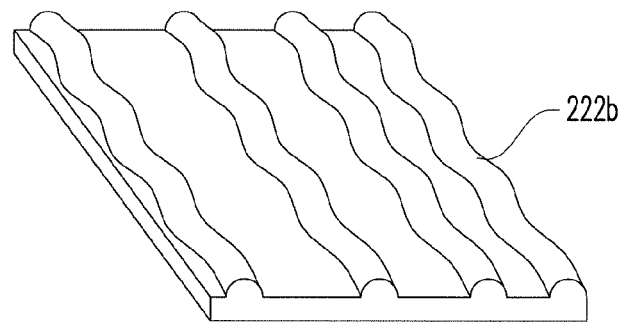
Figure 3C:
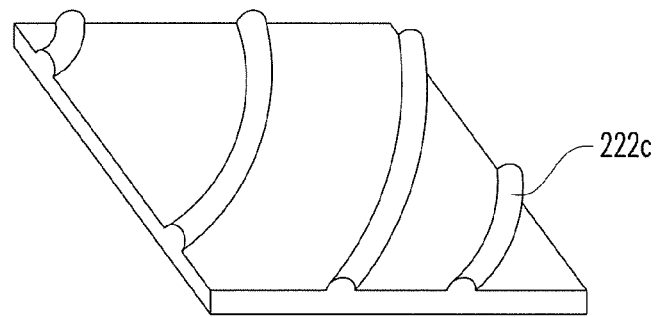
Figure 3D:
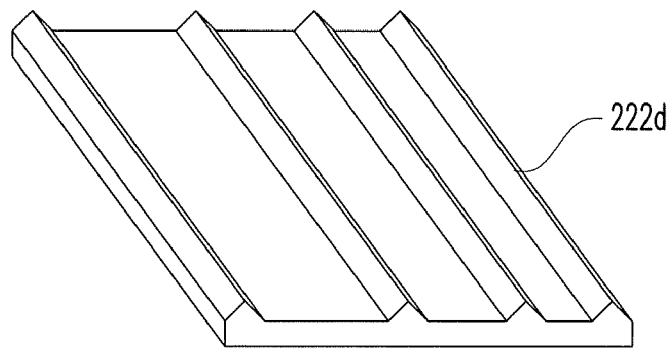
Figure 3E:
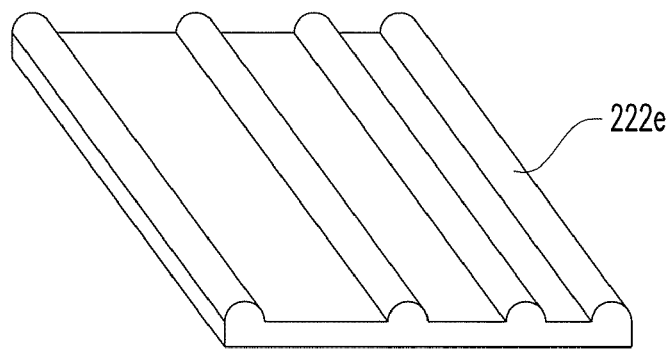
Figure 3F:
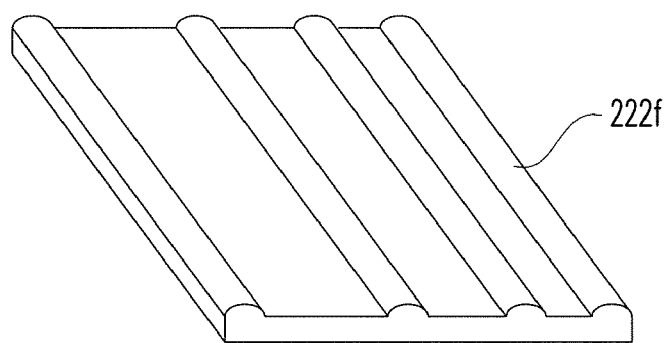
Figure 3G:
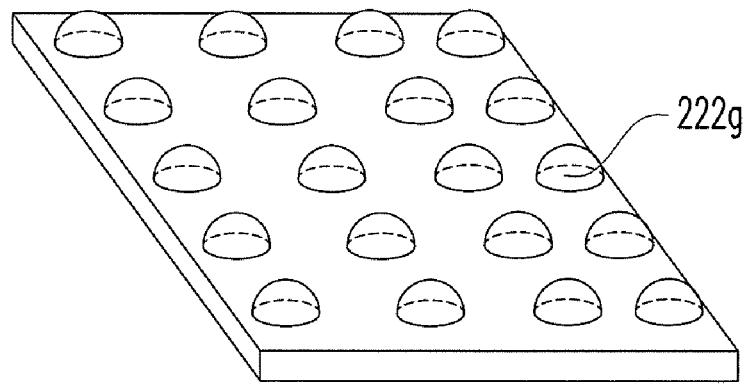
Figure 3H:
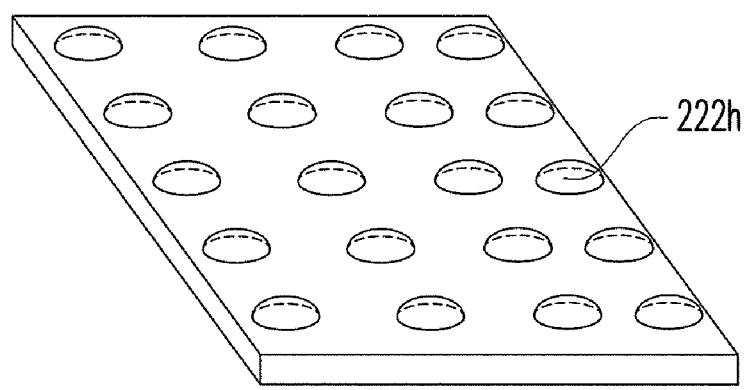
Figure 3I:
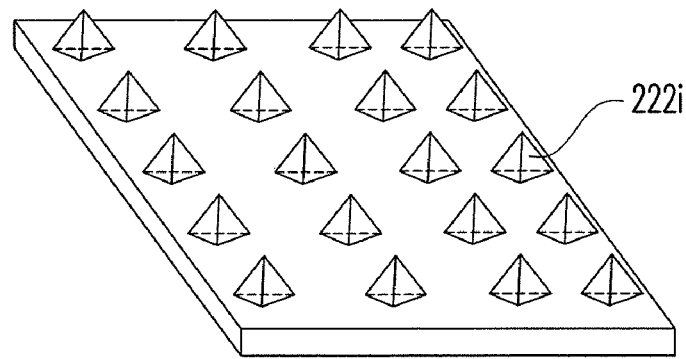
Figure 3J:
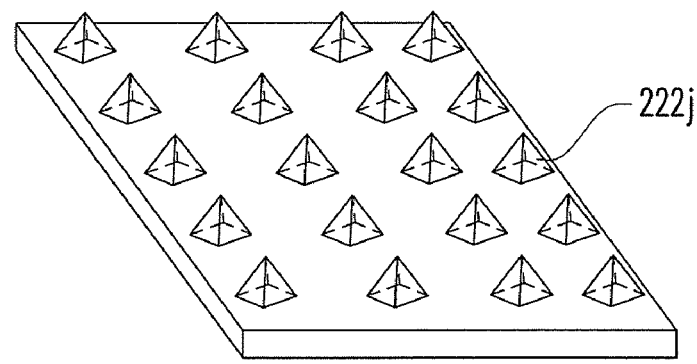
Figure 3K:
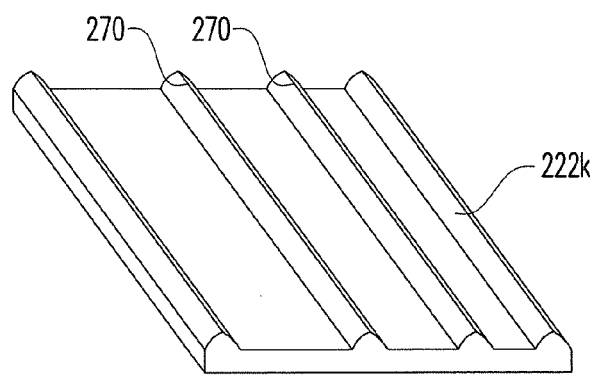
Figure 3L:
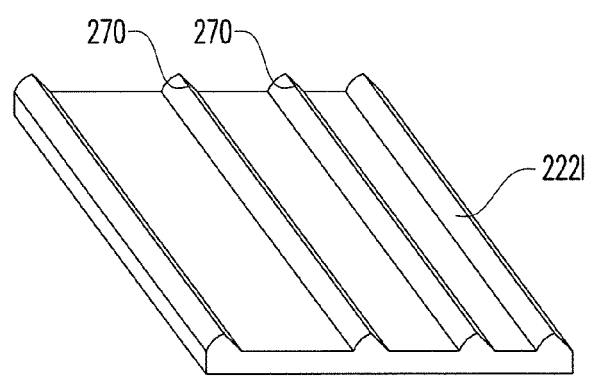
Figure 3M:
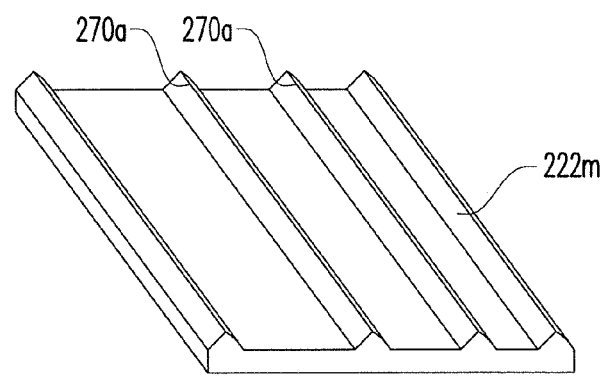
Figure 3N:
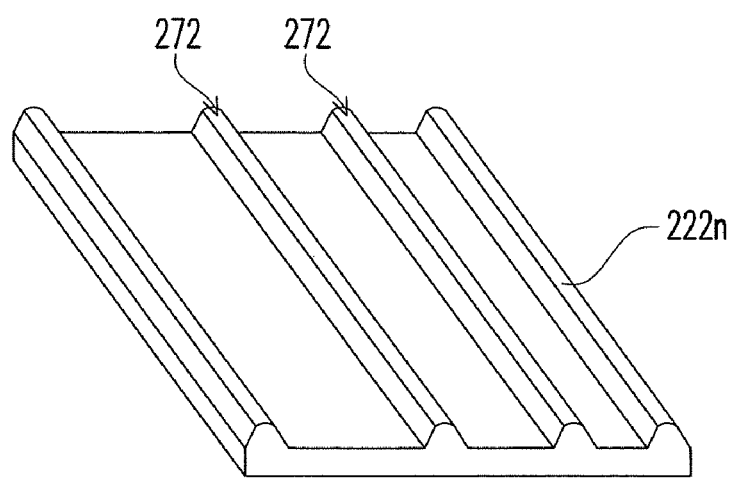
Figure 3O:
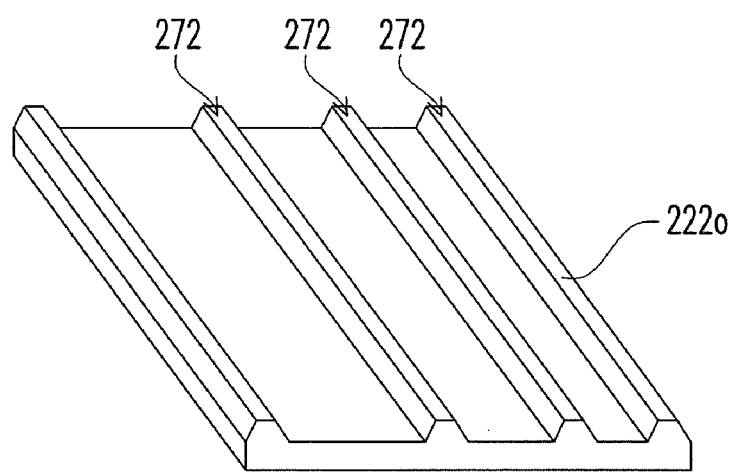

It should be noted that the micro-structures 222 may be designed to have a variety of shapes, as shown in FIGS. 3A to 3J. The micro-structures 222 may be strip structures or dot structures. The strip structure may be a straight line structure, a curved structure, or an arc structure, as shown in FIGS. 3A to 3C. The micro-structures 222 may also be triangular prisms, semi-circular columns, or semi-elliptical columns, as shown in FIGS. 3D to 3F. Furthermore, the dot structure may be a hemisphere, an elliptical hemisphere, a quadrangular pyramid, or a triangular pyramid, as shown in FIGS. 3G to 3J. In addition, each micro-structure 222 may be an arc column with different curvature radiuses at two sides of the center line 270, as shown in FIG. 3K, or may be an arc column at one side of the center line 270 and a prism at the other side, as shown in FIG. 3L, or may be an arc column and a prism respectively at each side of a crest line 270a (different from the center line 270), as shown in FIG. 3M, or may be an arc column with a curvature radius at the top end 272 and prisms at two sides, as shown in FIG. 3N, or may be a plane at the top end 272 and have a prism at each side thereof, as shown in FIG. 3O.

Definitely, those of ordinary skills in the art can make appropriate adjustments on the micro-structures 222 according to the actual requirements.

Figure 4A:
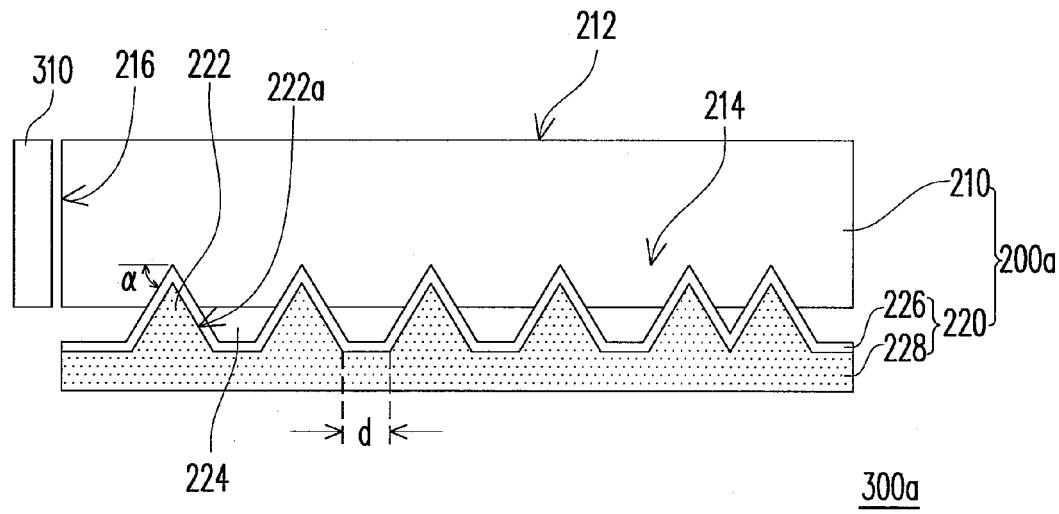
FIGS. 4A and 4B are schematic views of a light-emitting apparatus according to an embodiment of the present invention.
Figure 4B:
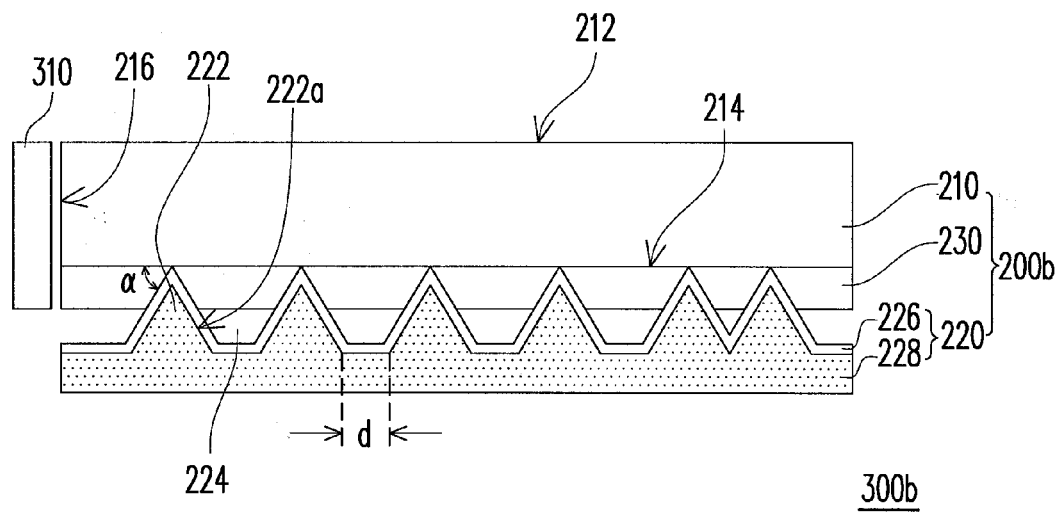

FIG. 4A is a schematic view of a light-emitting apparatus according to an embodiment of the present invention. Referring to FIG. 4A, a light-emitting apparatus 300a includes at least one light source 310 and a light guide plate 200a. The light source 310 is disposed at an end of the light incident surface 216 of the light guide plate 200a. In an embodiment, the light source 310 includes a cold cathode fluorescent lamp (CCFL) or a light-emitting diode (LED). In this manner, the light guide plate 200a can transfer the light source 310 to a uniform planar illumination. The loss of the light source 310 is small after the light enters the light guide plate 200a by the use of the micro-structural reflective film 220 of the light guide plate 200a, such that the light-emitting apparatus 300a can make the efficient use of the light source 310, so as to provide high light-emitting efficiency. The light-emitting apparatus in FIG. 4A uses the light guide plate 200a in FIG. 2A. In another embodiment of the present invention, as shown in FIG. 4B, the light guide plate in the light-emitting apparatus 300b is the light guide plate 200b in FIG. 2B. In other embodiments (not shown), the light emitting apparatus 300a or 300b may also adopt the light guide plates 200c, 200d, or implementation aspects derived there-from.

In view of the above, the light guide plate of the present invention uses a transparent light guide substrate in conjunction with a micro-structural reflective film, such that the light guide plate not only make the light source become uniform, but also has well-controlled light-emitting property. The light-emitting apparatus having the light guide plate further has high light-emitting efficiency, thus reducing the number of the optical films and further reducing the production cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide plate, comprising:
    a transparent light guide substrate, having a light-emitting surface, a bottom surface opposite to the light-emitting surface, and at least one light incident surface connecting the light-emitting surface and the bottom surface; and
    a micro-structural reflective film, disposed below the bottom surface of the transparent light guide substrate, and comprising a micro-structural layer and a reflective material layer, wherein the micro-structural layer has a plurality of micro-structures, the reflective material layer covers the micro-structures, and the reflective material layer is made of silver, aluminum, titanium, nickel, or chromium, or an alloy thereof;
    wherein merely top ends of the micro-structures and the reflective material layer are partially laminated on the transparent light guide substrate, such that an air gap is existed between the transparent light guide substrate and the micro-structural reflective films.

2. The light guide plate as claimed in claim 1, wherein the light guide substrate is made of a high light-transmissive plastic material.

3. The light guide plate as claimed in claim 1, wherein the light guide substrate is made of polymethyl methacrylate (PMMA), polycarbonate (PC), or cyclo olefin copolymers.

4. The light guide plate as claimed in claim 1, wherein a height of the micro-structures is between 3 μm and 50 μm.

5. The light guide plate as claimed in claim 1, wherein a distance is formed between adjacent micro-structures, and the distances descend in a direction away from the light incident surface.

6. The light guide plate as claimed in claim 1, wherein a size of the micro-structures is increased in the direction away from the light incident surface.

7. The light guide plate as claimed in claim 1, wherein the light-emitting surface of the transparent light guide substrate further comprises a plurality of light emitting micro-structures.

8. The light guide plate as claimed in claim 1, wherein a shape of the transparent light guide substrate is rectangular or wedge-shaped.

9. The light guide plate as claimed in claim 1, wherein each of the micro-structures has at least one side surface, and an included angle formed between the side surface and the bottom surface of the transparent light guide substrate is between 25 degrees and 40 degrees.

10. The light guide plate as claimed in claim 9, wherein the side surface comprises a flat surface or a curved surface.

11. The light guide plate as claimed in claim 1, wherein each of the micro-structures is a strip structure or a dot structure.

12. The light guide plate as claimed in claim 11, wherein the strip structure comprises a straight line structure, a curved structure, or an arc structure.

13. The light guide plate as claimed in claim 11, wherein the strip structure comprises triangular prisms, semi-circular columns, or semi-elliptical columns.

14. The light guide plate as claimed in claim 11, wherein the dot structure comprises a hemisphere, an elliptical hemisphere, a quadrangular pyramid, or a triangular pyramid.

15. The light guide plate as claimed in claim 1, further comprising an adhesion layer disposed between the bottom surface of the transparent light guide substrate and the micro-structural reflective films, such that the air gap is located between the micro-structural reflective films and the adhesion layer.

16. The light guide plate as claimed in claim 15, wherein a refractive index of the adhesion layer is greater than or equal to that of the transparent light guide substrate.

17. The light guide plate as claimed in claim 15, wherein a thickness of the adhesion layer is between 0.1 μm and 20 μm.

18. The light guide plate as claimed in claim 15, wherein the adhesion layer is made of a transparent polymer.

19. The light guide plate as claimed in claim 15, wherein the adhesion layer is made of a thermal melt adhesive, a thermal curable adhesive, or a UV curable resin.

20. A light-emitting apparatus, comprising:
at least one light source; and
a light guide plate, comprising:
a transparent light guide substrate, having a light-emitting surface, a bottom surface opposite to the light-emitting surface, and at least one light incident surface connecting the light-emitting surface and the bottom surface, wherein the light source is disposed at an end of the light incident surface; and
a micro-structural reflective film, disposed below the bottom surface of the transparent light guide substrate, and comprising a micro-structural layer and a reflective material layer, wherein the micro-structural layer has a plurality of micro-structures, and the reflective material layer covers the micro-structures; wherein merely top ends of the micro-structures and the reflective material layer are partially laminated on the transparent light guide substrate, such that an air gap is existed between the transparent light guide substrate and the micro-structural reflective films.

21. The light-emitting apparatus as claimed in claim 20, wherein the light guide substrate is made of a high light-transmissive plastic material.

22. The light-emitting apparatus as claimed in claim 20, wherein the light guide substrate is made of polymethyl methacrylate (PMMA), polycarbonate (PC), or cyclo olefin copolymers.

23. The light-emitting apparatus as claimed in claim 20, wherein a height of the micro-structures is between 3 μm and 50 μm.

24. The light-emitting apparatus as claimed in claim 20, wherein the reflective material layer is made of silver, aluminum, titanium, nickel, or chromium, or an alloy thereof.

25. The light-emitting apparatus as claimed in claim 20, wherein a distance is formed between adjacent micro-structures, and the distances descend in a direction away from the light incident surface.

26. The light-emitting apparatus as claimed in claim 20, wherein a size of the micro-structures is increased in the direction away from the light incident surface.

27. The light-emitting apparatus as claimed in claim 20, wherein the light-emitting surface of the transparent light guide substrate further comprises a plurality of light emitting micro-structures.

28. The light-emitting apparatus as claimed in claim 20, wherein a shape of the transparent light guide substrate is rectangular or wedge-shaped.

29. The light-emitting apparatus as claimed in claim 20, wherein the light source comprises a cold cathode fluorescent lamp (CCFL) or a light-emitting diode (LED).

30. The light-emitting apparatus as claimed in claim 20, wherein each of the micro-structures has at least one side surface, and an included angle formed between the side surface and the bottom surface of the transparent light guide substrate is between 25 degrees and 40 degrees.

31. The light-emitting apparatus as claimed in claim 30, wherein the side surface comprises a flat surface or a curved surface.

32. The light-emitting apparatus as claimed in claim 20, wherein each of the micro-structures is a strip structure or a dot structure.

33. The light-emitting apparatus as claimed in claim 32, wherein the strip structure comprises a straight line structure, a curved structure, or an arc structure.

34. The light-emitting apparatus as claimed in claim 32, wherein the strip structure comprises triangular prisms, semi-circular columns, or semi-elliptical columns.

35. The light-emitting apparatus as claimed in claim 32, wherein the dot structure comprises a hemisphere, an elliptical hemisphere, a quadrangular pyramid, or a triangular pyramid.

36. The light-emitting apparatus as claimed in claim 20, further comprising an adhesion layer disposed between the bottom surface of the transparent light guide substrate and the micro-structural reflective films, wherein the air gap is located between the micro-structural reflective films and the adhesion layer.

37. The light-emitting apparatus as claimed in claim 36, wherein a refractive index of the adhesion layer is greater than or equal to that of the transparent light guide substrate.

38. The light-emitting apparatus as claimed in claim 36, wherein a thickness of the adhesion layer is between 0.1 μm and 20 μm.

39. The light-emitting apparatus as claimed in claim 36, wherein the adhesion layer is made of a transparent polymer.

40. The light-emitting apparatus as claimed in claim 36, wherein the adhesion layer is made of a thermal melt adhesive, a thermal curable adhesive, or a UV curable resin.

* * * * *